No. 753,784. PATENTED MAR. 1, 1904.
O. F. AMBURN.
COLLAR AND NECKTIE RETAINER.
APPLICATION FILED MAY 1, 1903.
NO MODEL.
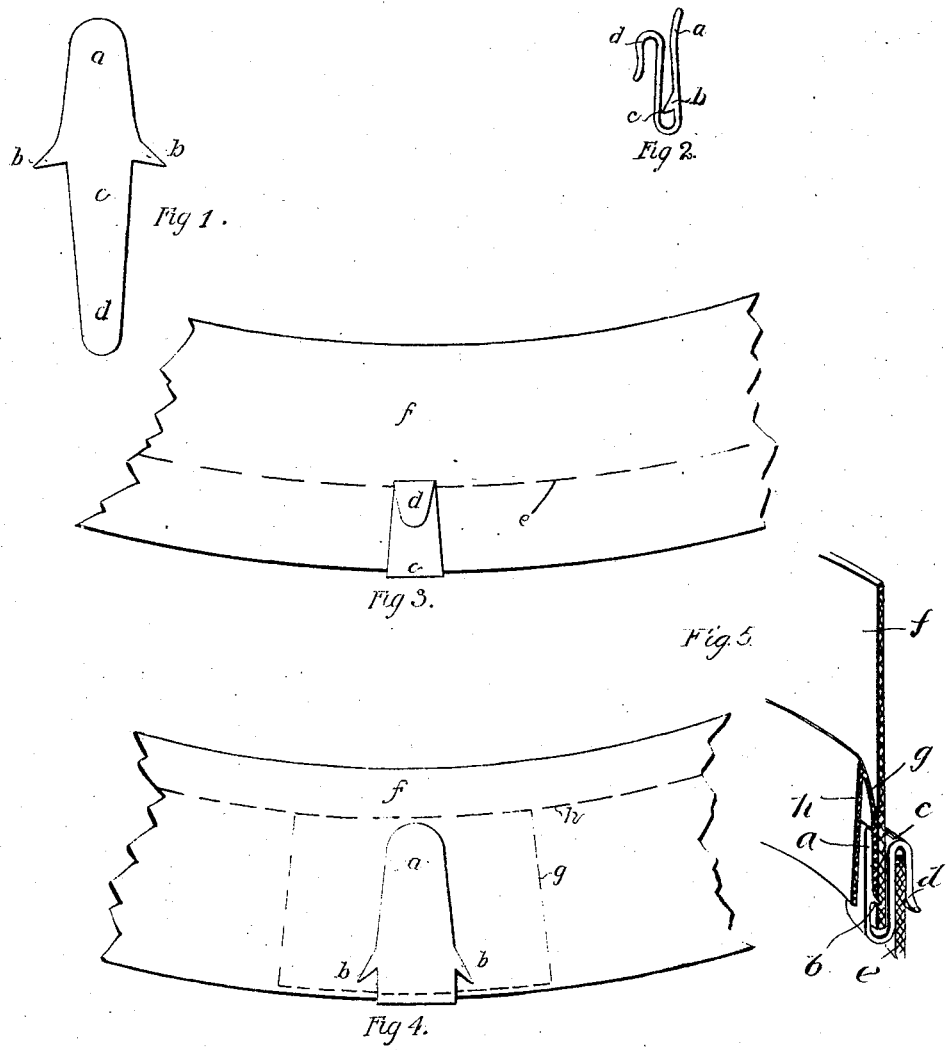

No. 753,784. Patented March 1, 1904.

UNITED STATES PATENT OFFICE.

OTIS F. AMBURN, OF OKLAHOMA, OKLAHOMA TERRITORY, ASSIGNOR OF ONE-HALF TO OSCAR P. GIBSON, OF OKLAHOMA, OKLAHOMA TERRITORY.

COLLAR AND NECKTIE RETAINER.

SPECIFICATION forming part of Letters Patent No. 753,784, dated March 1, 1904.

Application filed May 1, 1903. Serial No. 155,232. (No model.)

*To all whom it may concern:*

Be it known that I, OTIS F. AMBURN, a citizen of the United States of America, and a resident of Oklahoma, Territory of Oklahoma, have invented certain new and useful Improvements in Collar and Necktie Retainers; and I do declare the following to be a clear and exact description of my invention.

My invention relates to a simple device by which the collar is secured at the back without a buttonhole, requiring little or no aid of the fingers and furnishing a means by which the necktie or scarf is held in place.

The device is simple of construction and cheap of manufacture, all of which will be more clearly set forth with reference to the accompanying drawings and subsequently claimed.

Figure 1 represents a front view of a blank of my device before it is bent for use. Fig. 2 represents a side view of the complete device bent into a U-shaped figure. Fig. 3 indicates the device in use, the hooked tail portion receiving the tie or neck-scarf. Fig. 4 is a view showing my device lying between the plies of the neckband of the shirt. Fig. 5 is a sectional view through Fig. 4, showing in section the pocket formed by the plies $h$ and $g$, also showing the collar and necktie in section and the necktie-fastener in side view.

Similar letters of reference indicate similar parts throughout the several figures of the drawings.

$a$ indicates a head or base, which slips between the plies $h$ and $g$ of the double neckband of the shirt, as shown in Fig. 4. $b$ indicates the prongs or teeth which securely hold the device after being placed on the collar $f$, as shown in Figs. 4 and 5. $c$ is the tail or portion bent upward with a reverse bend $d$, forming a hook at its extreme end to hold the tie or neck-scarf in place, as shown in Fig. 3. $e$ represents the scarf confined beneath the hooked portion $d$. $f$ represents the collar. $h$ represents the neckband of the shirt, and $g$ the extra ply which forms a pocket for said base.

My device is fastened to the collar instead of shirt and eliminates the objectionable feature of reaching behind to fasten the collar, as with the ordinary button. By slipping the collar between the teeth $b$, which are bent inward and slant downward, and the tail portion $c$, which requires but a slight pressure of the fingers, the collar is held firmly in position, the teeth $b$, on account of their peculiar construction, biting into the linen, preventing a backward or side movement. To remove the device, the collar is bent backward until the teeth $b$ release themselves, when the device is easily removed.

Perhaps the most practical method of placing the collar after my device is affixed thereto is to first button one end of the collar $f$, and by drawing the collar around the neck the base $a$ slips between the plies $g$ and $h$ without the fingers as a guide, and by buttoning the other end of the collar all is made secure. By unbuttoning one end of the collar my device falls out of its confinement of its own accord, thus making its use practically automatic.

The flat construction of the device prevents any inconvenience to the neck whatever—a very important feature. As is readily seen, there is no need of a buttonhole at the back of collar whatever nor at the back of neckband of the shirt. The device being held firmly to the collar is prevented from moving in any direction, allowing no discoloration of the linen through rubbing. Being all one piece, the device is cheap of manufacture and cannot get out of repair.

So many collars are rendered worthless through the buttonhole becoming torn and worn, allowing an ordinary button to escape. My device requires no buttonhole whatever, and for celluloid and rubber collars it is particularly valuable, and it does not break the rubber and can remain in the collar until the collar is worn out.

My device, as described, can be used on downturned collars as well as on standing collars, the hook $d$ preventing the tie from falling from between the folds. If desirable, the hook may be omitted for the use on down-turned collars.

I am aware that prior to my invention it was old and common to fasten necktie-fasteners with the aid of teeth or prongs. I therefore do not claim such a combination, broadly; but What I do claim as my invention, and desire to secure by Letters Patent, is—

A collar and necktie retainer made of suitable material and bent substantially into a U-shaped figure with a hook $d$, one end portion or base of the said U-shaped figure to slip between the plies of a pocket-neckband of a shirt, the other end of said U-shaped figure being bent upward and forming the hook $d$ for engaging the band of the necktie, said base of the U-shaped figure carrying two teeth or prongs, said teeth or prongs being bent inward, the collar being held between said teeth or prongs and the upward-bent portion, as specified and for the purpose set forth.

In testimony whereof I have signed my name to this specification in the presence of two subscribing witnesses.

OTIS F. AMBURN.

Witnesses:
   JESSE J. BROWN,
   ROBERT L. DAVIS.